US012749980B2

(12) United States Patent
Sultenfuss et al.

(10) Patent No.: US 12,749,980 B2
(45) Date of Patent: Sep. 29, 2026

(54) POWER ADAPTER DEVICE WITH INPUT POWER DETECTION

(71) Applicant: DELL PRODUCTS L.P., Round Rock, TX (US)

(72) Inventors: Andrew T. Sultenfuss, Leander, TX (US); Chi Che Wu, Taipei (TW); Wei-Cheng Yu, New Taipei City (TW)

(73) Assignee: Dell Products L.P., Round Rock, TX (US)

( * ) Notice: Subject to any disclaimer, the term of this patent is extended or adjusted under 35 U.S.C. 154(b) by 185 days.

(21) Appl. No.: 18/790,518

(22) Filed: Jul. 31, 2024

(65) Prior Publication Data

US 2026/0039205 A1 Feb. 5, 2026

(51) Int. Cl.
*H02M 3/335* (2006.01)
*H02M 3/00* (2006.01)

(52) U.S. Cl.
CPC ............. *H02M 3/335* (2013.01); *H02M 3/01* (2021.05)

(58) Field of Classification Search
CPC ................................ H02M 3/335; H02M 3/01
See application file for complete search history.

(56) References Cited

U.S. PATENT DOCUMENTS

| | | | | |
|---|---|---|---|---|
| 11,437,914 | B2 * | 9/2022 | Yu | G06F 1/266 |
| 11,916,430 | B2 | 2/2024 | Sultenfuss et al. | |
| 2018/0373289 | A1 | 12/2018 | Sultenfuss et al. | |
| 2021/0249961 | A1 * | 8/2021 | Yu | G06F 1/26 |
| 2025/0286470 | A1 * | 9/2025 | Chang | H02M 3/33523 |

* cited by examiner

*Primary Examiner* — Rafael O De Leon Domenech
(74) *Attorney, Agent, or Firm* — Larson Newman, LLP

(57) ABSTRACT

A power adapter device includes a rectifier bridge, a transformer, and a power delivery integrated circuit (PD IC). The rectifier bridge includes input terminals that receive an alternating current (AC) voltage for the power adapter device, and output terminals. The transformer includes a primary side that is coupled to one of the output terminals of the rectifier bridge, and a secondary side that includes a secondary side coil and a sub-coil. The PD IC is coupled to the sub-coil of the transformer. The PD IC determines a direct current (DC) voltage across the sub-coil of the transformer. Based on the DC voltage, the PD IC determines a voltage level of the AC voltage and stores the determined voltage level of the AC voltage.

20 Claims, 4 Drawing Sheets

POWER ADAPTER DEVICE WITH INPUT POWER DETECTION

FIELD OF THE DISCLOSURE

The present disclosure generally relates to information handling systems, and more particularly relates to determining an input power to a power adapter device.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems.

Information handling systems can also implement various virtualized architectures. Data and voice communications among information handling systems may be via networks that are wired, wireless, or some combination.

SUMMARY

A power adapter device includes a rectifier bridge having input terminals that may receive an alternating current (AC) voltage for a power adapter device, and output terminals. A transformer includes a primary side that is coupled to one of the output terminals of the rectifier bridge, and a secondary side that includes a secondary side coil and a sub-coil. A power delivery integrated circuit (PD IC) is coupled to the sub-coil of the transformer. The PD IC may determine a direct current (DC) voltage across the sub-coil of the transformer. Based on the DC voltage, the PD IC may determine a voltage level of the AC voltage and store the determined voltage level of the AC voltage.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
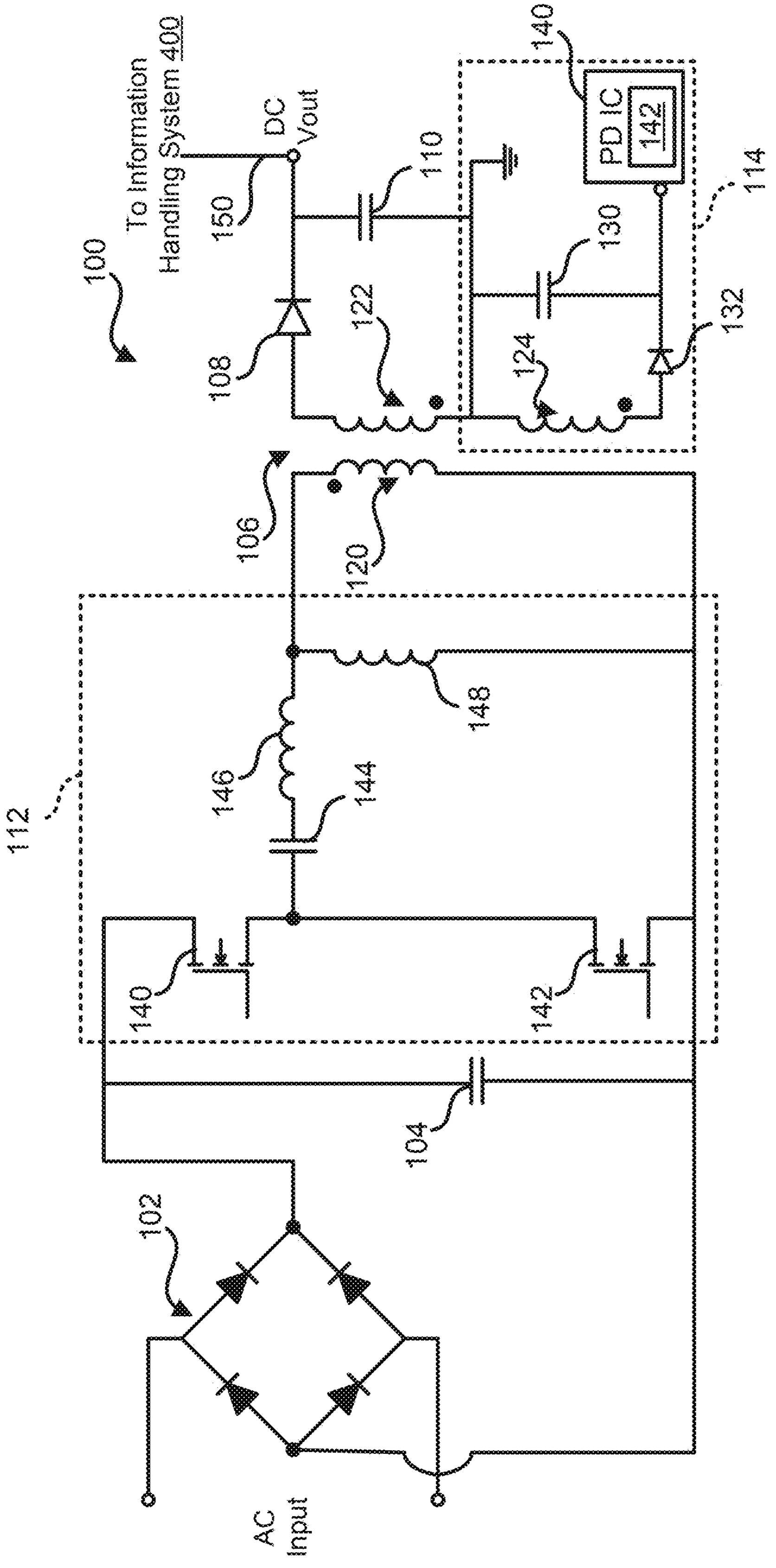
FIG. 1 is a diagram of an embodiment of a power adapter device for an information handling system according to at least one embodiment of the present disclosure.

FIG. 1 illustrates a power adapter device 100 for an information handling system according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Power adapter device 100 includes a bridge rectifier 102, a capacitor 104, a transformer 106, a diode 108, a capacitor 110, an inductor, inductor, capacitor (LLC) circuit 112, and voltage detection circuitry 114. In an example, transformer 106 includes a primary winding 120 and dual secondary windings 122 and 124. Voltage detection circuitry 114 includes a section of secondary winding or sub-coil 124 of transformer 106, a capacitor 130, and a diode 132. LLC circuit 112 includes transistors 140 and 142, a capacitor 144, and inductors 146 and 148. Power adapter device 100 may include additional components without varying from the scope of this disclosure.

Bridge rectifier 102 includes a set of input terminals and a set of output terminals. Capacitor 104 includes a first terminal coupled to one of the output terminals of bridge rectifier 102, and a second terminal coupled to the other output terminal of the bridge rectifier. Transistor 140 of LLC circuit 112 includes first and second current electrodes and a control electrode. The first current electrode of transistor 140 is coupled to the first terminal of capacitor 104. Transistor 142 of LLC circuit 112 includes first and second current electrodes and a control electrode. The first current electrode of transistor 142 is coupled to the second current electrode of transistor 140, the second current electrode is coupled to the second terminal of capacitor 104.

Capacitor 144 of LLC circuit 112 includes a first terminal coupled to the second current electrode of transistor 140 and to the first current electrode of transistor 142, and a second terminal. Inductor 146 of LLC circuit 112 includes a first terminal coupled to the second terminal of capacitor 144 and a second terminal. Inductor 148 of LLC circuit 112 includes a first terminal coupled to the second terminal of inductor 146 and a second terminal coupled to the second current electrode of transistor 142.

Primary winding 120 of transformer 106 has first and second terminals, and the first terminal is coupled to the second terminal of inductor 146 and to the first terminal of inductor 148. First portion of secondary winding 122 of transformer 106 includes first and second terminals, and the second terminal is coupled to a reference ground voltage. Diode 108 includes first and second terminals, and the first terminal is coupled to the first portion of secondary winding 122 of transformer 106. Capacitor 110 includes a first terminal coupled to the second terminal of diode 108, and a second terminal coupled to the reference ground voltage. Sub-coil 124 of transformer 106 includes a first terminal coupled to the reference ground voltage and a second terminal.

Capacitor 130 includes a first terminal coupled to the reference ground voltage, and a second terminal coupled to an output terminal of voltage detection circuitry 114. Diode 132 includes a first terminal coupled to the second terminal of sub-coil 124 in transformer 106 and a second terminal coupled to the output terminal of voltage detection circuitry 114. In an example, the output terminal of voltage detection circuitry 114 may be coupled to a power delivery integrated circuit (PD IC) 140. In certain examples, PD IC 140 may be a portion of voltage detection circuitry 114.

During operation of power adapter 100, bridge rectifier 102 may receive an alternating current (AC) voltage input across the input terminals and provide a corresponding direct current (DC) voltage across the output terminals. The functions and features of power adapter device 100 to produce a steady state DC voltage, such as 5 volts, are known in the art and will not be further disclosed herein, except as needed to illustrate the various embodiments disclosed herein. Power adapter device 100 may have a Quasi Resonant (QR) Topology and may be utilized for charging of any suitable device, such as a portable computer, a tablet device, or the like. In previous QR systems, a high-side voltage, such as the AC input voltage, is reported to the device being charge through the universal serial bus type C (USB-C) connector cable 150. Power adapter device 100 may be improved by providing the AC line voltage range, which in turn may enable improved estimation of power convertor efficiency. In an example, PD IC 220 of FIG. 2 may use conversion characterization by state to estimate currents and system use by type and/or DC loading values as will be described herein.

In certain examples, an AC input voltage may be any voltage in a range of voltages, such as a range of 90 to 265 volts. In an example, the DC voltage may be provided to LLC circuit 112, which in turn provide an alternating DC voltage to transformer 106. Transistors 140 and 142, capacitor 144 and inductors 146 and 148 of LLC circuit 112 may operate as known in the art to generate the alternating DC voltage. The alternating DC voltage may be based on DC voltage output by bridge rectifier 102 from the input AC voltage. In an example, this alternating voltage may be provided through primary side winding 120, which in turn may induce a corresponding alternating voltage on secondary side 122 of transformer 106. The induced voltage on secondary side 122 may be reduced as compared to the voltage on primary side 120 based on the turn ratio of transformer 106. Diode 108 and capacitor 110 may combine to provide a steady state DC voltage at the DC Vout terminal of power adapter 100, and this steady state DC voltage may be provided to an information handling system, such as information handling system 400 of FIG. 4.

In an example, the alternating DC voltage may be further reduced, based on the turn ratio, across sub-coil 124 of the secondary side. This alternating voltage may be provided across capacitor 130 from taps across sub-coil 124. Diode 132 and capacitor 130 may combine to provide a steady state DC voltage to PD IC 140. In certain examples, the ground reference from secondary side 122 of transformer 106 may be a floating ground reference for detection of a DC voltage across capacitor 130. In an example, this DC voltage is captured by USB PD IC 140 or any other suitable DC low side controller.

In an example, PD IC 140 may perform one or more operations to determine the AC input voltage based the captured DC voltage across sub-coil 124. For example, PD IC 140 may utilize a table to determine the AC input voltage based on the captured DC voltage. In an example, the table may correlate different detected or captured DC voltages across sub-coil 124 to different AC input voltages. In this example, each different AC input voltage may create or generate a corresponding different DC voltage across sub-coil 124. An exemplary table for correlating an AC input voltage to a captured DC voltage is shown in Table 1 below.

TABLE 1

| Captured DC voltage | AC input voltage |
|---|---|
| 0.55 Volts | 110 Volts |
| 0.9 Volts | 180 Volts |
| 1.13 Volts | 220 Volts |

As illustrated in Table 1 above, as the AC input voltage increases the determined DC voltage may also increase. In certain examples, PD IC 140 may utilize the data in Table 1 to interpolate an AC input voltage corresponding to a DC voltage across sub-coil 124 even if the captured DC voltage is not located within Table 1. Thus, PD IC 140 may capture sub-coil 124 voltage and convert it to a voltage level for power adapter device 100 to recognize the AC input voltage. As also illustrated in Table 1, the DC voltage across sub-coil 124 is substantially smaller than the corresponding AC input voltage. In an example, this reduction from the AC input voltage to the captured DC voltage may be based on any suitable configuration of one or more components in power adapter device 100. For example, the reduction from the AC input voltage to DC voltage across sub-coil 124 may be based on the hot turn ratio between primary side 120 and secondary side 122 of transformer 106.

In response to the AC input voltage being determined, PD IC 140 may store the determined AC input voltage in memory 142 of the PD IC. In an example, this stored AC input voltage may be deleted from memory 142 when the AC input voltage is no longer provided to the input terminals of rectifier bridge 102. In response to the AC input voltage being determined, PD IC 140 may perform any suitable operations to calculate or determine an optimization level, a kilowatt per hour consumption, or the like for power adapter device 100. In an example, the optimization level, kilowatts per hour consumption, or any other calculated data may be stored within memory 142 of PC IC 140.

Figure 4:
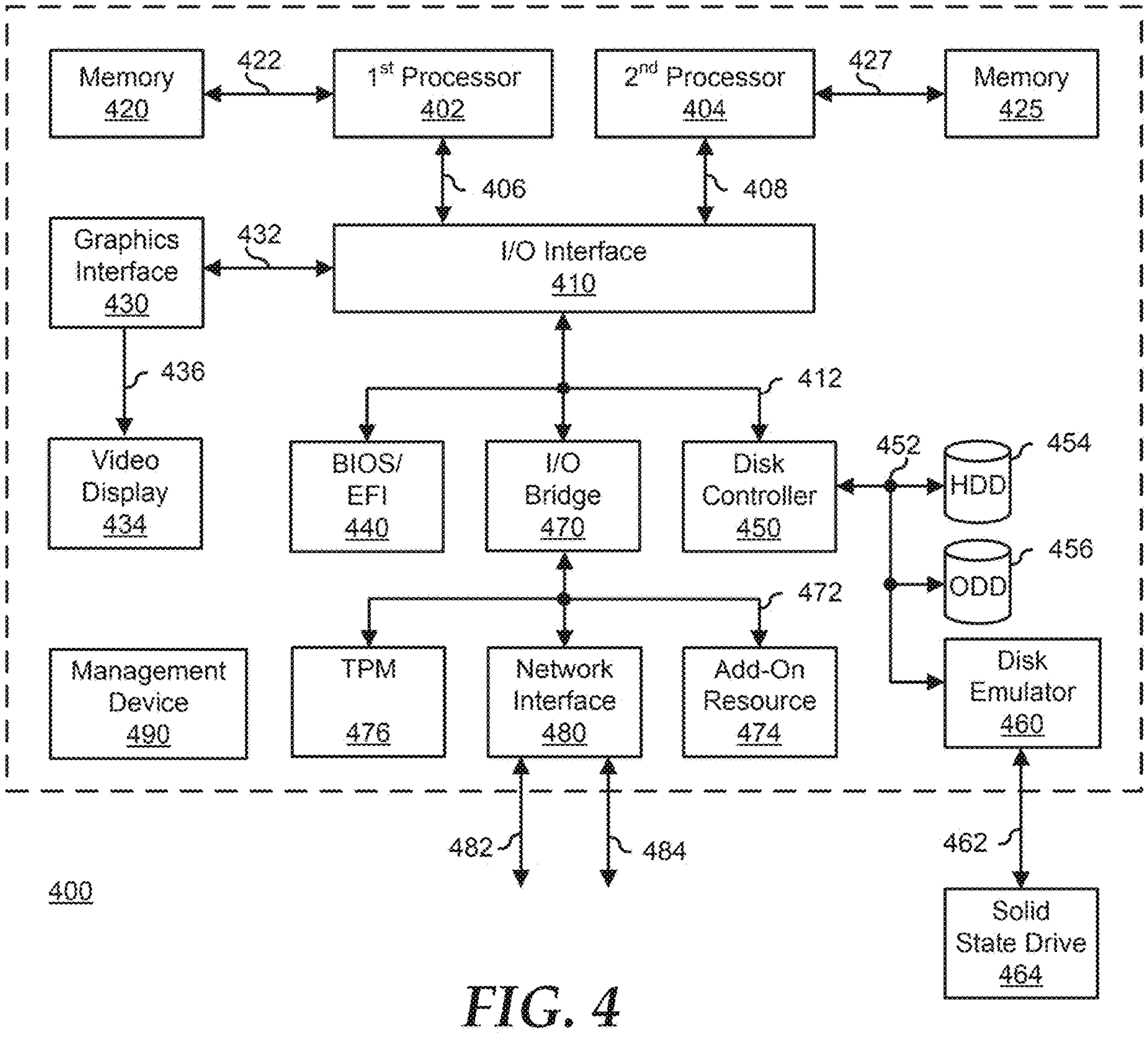
FIG. 4 is a block diagram of a general information handling system according to an embodiment of the present disclosure.

In certain examples, an information handling system, such as information handling system 400 of FIG. 4, coupled to power adapter device 100 via a USB-C power cable 150 may request data associated with the power adapter device from PD IC 140. In response to the request, PD IC 140 may provide the optimization level, kilowatts per hour consumption, AC input voltage, or any other calculated data to the information handling system via a USB-C power connector cable 150. In an example, the communication between PD IC 140 and the information handling system may be via a vendor direct message (VDM), register content, or the like. In an example, the data associated with power adapter 100 may also be provided to the manufacturer of both the power adapter and the information handling system.

Figure 2:
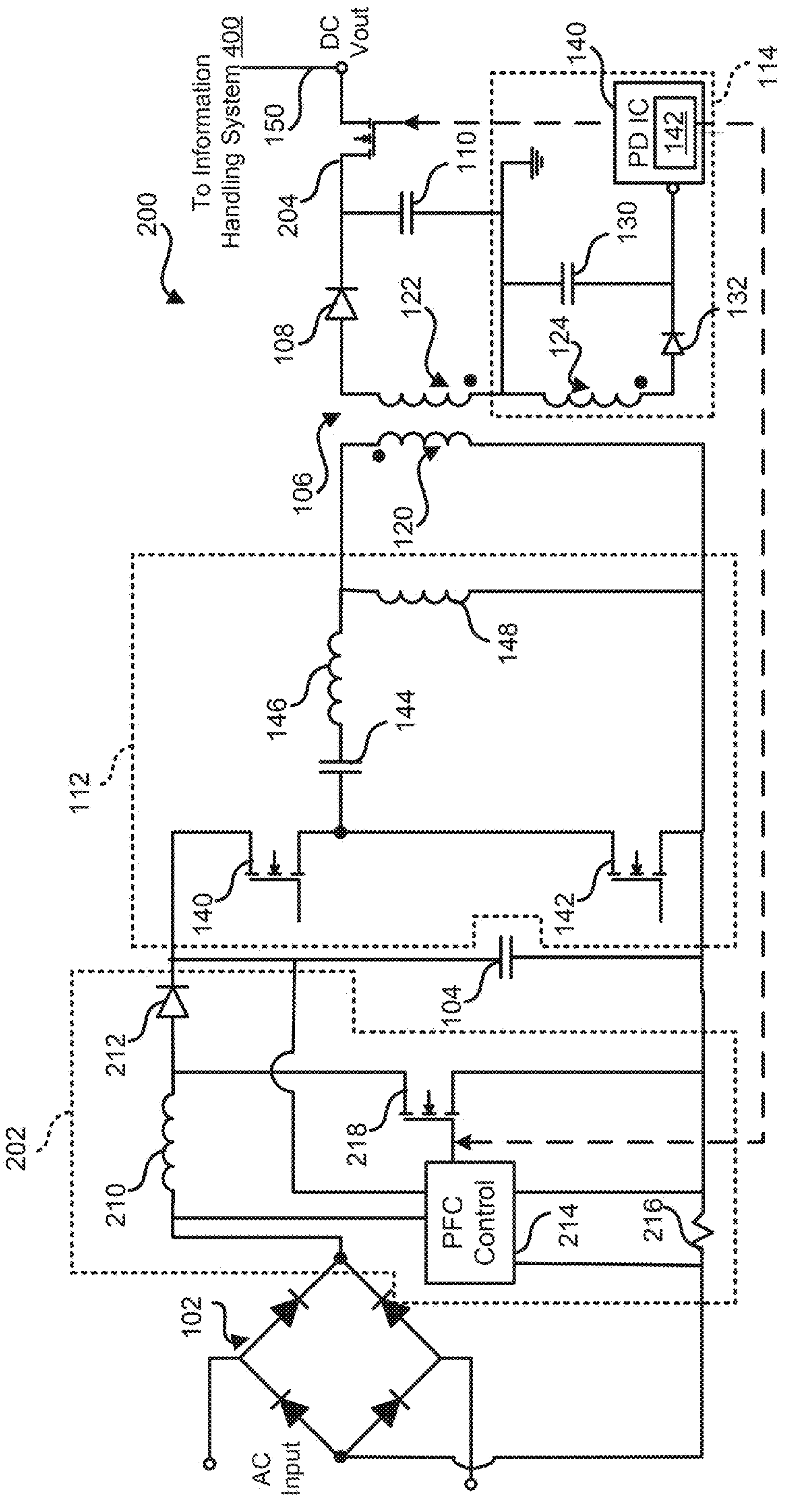
FIG. 2 is a diagram of another embodiment of the power adapter device for an information handling system according to at least one embodiment of the present disclosure.

FIG. 2 illustrates a power adapter device 200 for an information handling system according to at least one embodiment of the present disclosure. Power adapter device 200 includes a power factor correction (PFC) circuit 202 and a transistor 204. PFC circuit 202 includes an inductor 210, a diode 212, a PFC control device 214, a resistor 216, and a transistor 218. Power adapter device 200 may include components that are substantially similar to those in power adapter device 100, such as bridge rectifier 102, transformer 106, diode 108, capacitor 110, LLC circuit 112, and voltage detection circuitry 114. In an example, transformer 106 includes primary winding 120 and dual secondary windings 122 and 124. Voltage detection circuitry 114 includes a section of secondary winding or sub-coil 124 of transformer 106, capacitor 130, diode 132, and PD IC 140. LLC circuit 112 includes transistors 140 and 142, a capacitor 144, and inductors 146 and 148. Power adapter device 200 may include additional components without varying from the scope of this disclosure.

Bridge rectifier 102 includes a set of input terminals and a set of output terminals. Inductor 210 includes a first terminal coupled to one of the output terminals of bridge rectifier 102 and a second terminal. Diode 212 includes a first terminal coupled to the second terminal of inductor 210 and a second terminal. PFC control device 214 includes multiple terminals, such as first, second, third, fourth, and fifth terminals. The first terminal of PFC control device 214 is coupled to the first terminal of inductor 210 and the second terminal is coupled to the second terminal of diode 212. Resistor 216 includes a first terminal coupled to the fifth terminal of PFC control device 214 and a second terminal coupled to the fourth terminal of the PFC control device. Transistor 218 includes first and second current electrodes and a control electrode. The first current electrode of transistor 206 is coupled to the second terminal of inductor 210 and the second current electrode of the transistor is coupled to an output terminal of rectifier bridge 102. The control electrode of transistor 218 is coupled to PFC control device 214.

Transistor 140 of LLC circuit 112 includes first and second current electrodes and a control electrode. The first current electrode of transistor 140 is coupled to the second terminal of diode 212. Transistor 142 of LLC circuit 112 includes first and second current electrodes and a control electrode. The first current electrode of transistor 142 is coupled to the second current electrode of transistor 140, the second current electrode is coupled to the second terminal of capacitor 104.

Capacitor 144 of LLC circuit 112 includes a first terminal coupled to the second current electrode of transistor 140 and to the first current electrode of transistor 142, and a second terminal. Inductor 146 of LLC circuit 112 includes a first terminal coupled to the second terminal of capacitor 144 and a second terminal. Inductor 148 of LLC circuit 112 includes a first terminal coupled to the second terminal of inductor 146 and a second terminal coupled to the second current electrode of transistor 142.

Primary winding 120 of transformer 106 has first and second terminals, and the first terminal is coupled to the second terminal of inductor 146. First portion of secondary winding 122 of transformer 106 includes first and second terminals, and the second terminal is coupled to a reference ground voltage. Diode 108 includes first and second terminals, and the first terminal is coupled to the first portion of secondary winding 122 of transformer 106. Capacitor 110 includes a first terminal coupled to the second terminal of diode 108, and a second terminal coupled to the reference ground voltage. Transistor 204 includes first and second current electrodes and a control electrode. The first current electrode of transistor 204 is coupled to the second terminal of diode 108 and the second current electrode of the transistor is coupled to an output terminal of power adapter 200. Sub-coil 124 of transformer 106 includes a first terminal coupled to the reference ground voltage and a second terminal.

Capacitor 130 includes a first terminal coupled to the reference ground voltage, and a second terminal coupled to an output terminal of voltage detection circuitry 114. Diode 132 includes a first terminal coupled to the second terminal of sub-coil 124 in transformer 106 and a second terminal coupled to the output terminal of voltage detection circuitry 114. In an example, the output terminal of voltage detection circuitry 114 may be coupled to PD IC 140. In certain examples, PD IC 140 may be a portion of voltage detection circuitry 114.

In an example, inductor 210, diode 212, PFC control device 214, resistor 216, and transistor 218 may combine to provide power factor correction (PFC) within power adapter device 200. The functions and features of PFC 202 to produce PFC are known in the art and will not be further disclosed herein, except as needed to illustrate the various embodiments disclosed herein. The functions and features of power adapter device 200 to produce a steady state DC voltage, such as 5 volts, with PFC are known in the art and will not be further disclosed herein, except as needed to illustrate the various embodiments disclosed herein.

In certain examples, the topology of power adapter device 200 may be configured as a PFC stage for QR-flyback. In these examples, the topology may use the winding of transformer 106 with fewer turn rations on secondary side 122 to reflect AC input voltage and transfer it to the secondary side before blocking is turned on. In an example, the QR-flyback may be supported to detect AC input voltage through turn ratio of transformer 106 to get a low voltage level for PD IC 140 to identify the AC voltage.

In an example, when power adapter device 200 is first plugged into an AC power source, PD IC 140 may utilize the control electrode of transistor 218 to turn off PFC circuit 202 of the power adapter device and may utilize the control electrode of transistor 204 to turn off the DC output of the power adapter device. While PFC circuit 202 and the DC output voltage are turned off, PD IC 140 may determine the AC input voltage of power adapter in a substantially similar manner as described above with respect to FIG. 1. For example, PD IC 140 may capture sub-coil 124 voltage and convert it to an input voltage level for power adapter device 200 to determine the AC input voltage. After the AC input voltage has been determined, PD IC 140 may utilize the control electrode of transistor 218 to turn on PFC circuit 202 of power adapter device 200 and may utilize the control electrode of transistor 204 to turn on the DC output of the power adapter device.

In certain examples, the topologies of power adapter devices 100 and 200 may perform unique conversions of the AC input voltage to a lower DC voltage level through transformer 106 and an optocoupler to provide a linear voltage via PD IC 140 to obtain AC input voltage ranges information. As described herein, the determination of the AC input voltage may be performed by PD IC 140 across various power topologies, such as an asymmetric half-bridge (AHB), QR-flyback, active clamp flyback (ACF), or the like.

Figure 3:
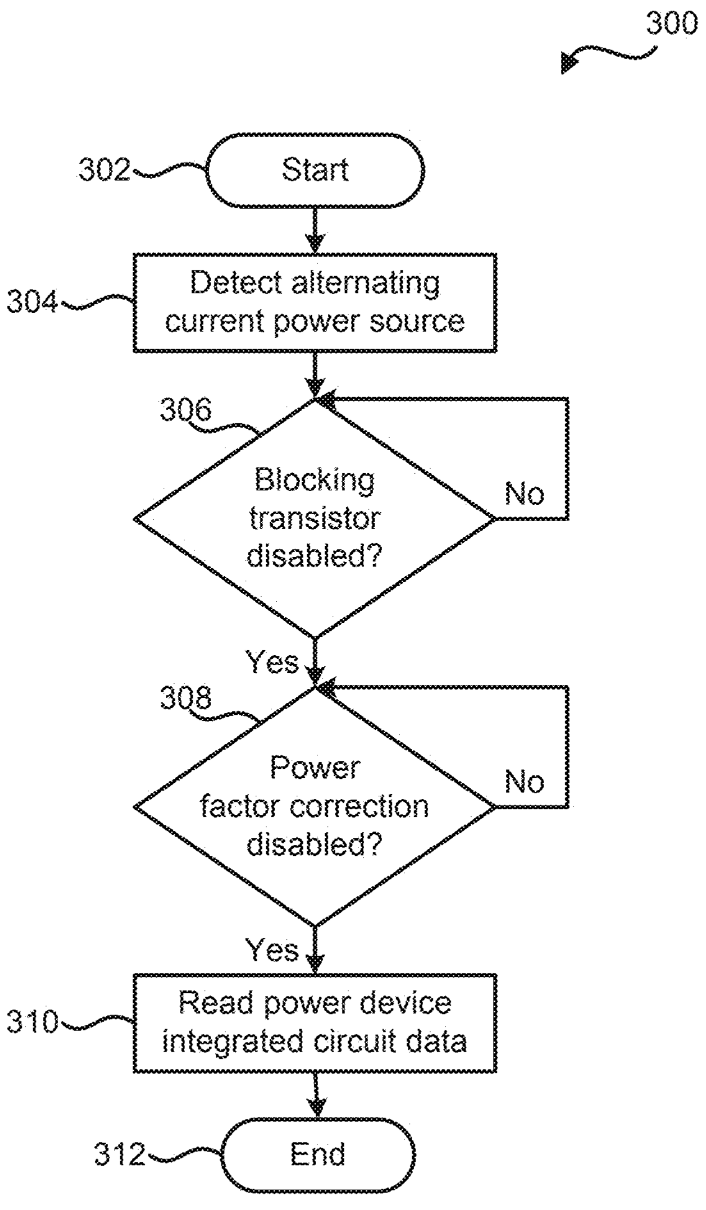
FIG. 3 is a flow diagram of a method for determining an input power level for a power adapter device at least one embodiment of the present disclosure.

FIG. 3 is a flow diagram of a method 300 for determining an input power level for a power adapter device according to at least one embodiment of the present disclosure, starting at block 302. It will be readily appreciated that not every method step set forth in this flow diagram is always necessary, and that certain steps of the methods may be combined, performed simultaneously, in a different order, or perhaps omitted, without varying from the scope of the disclosure. FIG. 3 may be employed in whole, or in part, PD IC 140 of voltage detection circuitry 114 in FIGS. 1 and 2, or any other type of controller, device, module, processor, or any combination thereof, operable to employ all, or portions of, the method of FIG. 3.

At block 304, an AC input voltage source is detected. The AC input voltage power source may be detected in any suitable manner and may be detected in response to a power adapter device being plugged into the AC input voltage power source. In an example, a PD IC of the power adapter may detect the AC input voltage based on a current being provided to the PD IC. At block 306, a determination is made whether a blocking transistor has been disabled. In an example, if the blocking transistor has not been disabled, the PD IC may disable the blocking transistor. When the blocking transistor has been disabled, a determination is made whether a power factor correction (PFC) disabled at block 308.

If the PFC has not been disabled, the PD IC may disable the PFC. In response to the PFC being disabled, PD IC data is read at block 310 and the flow ends at block 312. In an example, the PD IC data may be any suitable data associated with the power adapter device. For example, the PD IC data may include but is not limited to an optimization level, kilowatts per hour consumption, AC input voltage, or any other calculated data for the power adapter device. In certain examples, the PD IC may determine this data while the output voltage is blocked and the PFC is turned off. In an example, the PD IC data may be stored in a memory of the PD IC until the AC power source is removed from the power adapter device.

FIG. 4 shows a generalized embodiment of an information handling system 400 according to an embodiment of the present disclosure. Information handling system 400 may be substantially similar to information handling system 106 of FIG. 1. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 464, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456, disk emulator 460, SSD 464, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432 and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 4394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412 or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400.

Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed, or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A power adapter device comprising:

a rectifier bridge including input terminals to receive an alternating current (AC) input voltage for the power adapter device, and output terminals;

a transformer including a primary side coupled to one of the output terminals of the rectifier bridge, and a secondary side including a secondary side coil and a sub-coil;

a power delivery integrated circuit (PD IC) coupled to the sub-coil of the transformer, the PD IC to:

disable a power factor correction of the power adapter device;

determine a direct current (DC) voltage across the sub-coil of the transformer;

based on the DC voltage, determine a voltage level of the AC input voltage; and store the determined voltage level of the AC input voltage.

2. The power adapter device of claim 1, wherein the PD IC further to determine an optimization level of the power adapter device based on the determined voltage level of the AC input voltage.

3. The power adapter device of claim 1, wherein the PD IC further to determine a kilowatt per hour consumption of the power adapter device based on the determined voltage level of the AC input voltage.

4. The power adapter device of claim 1, wherein the PD IC further to:

receive a request for data stored in the PD IC; and in response to the reception of the request, provide the voltage level of the AC input voltage.

5. The power adapter device of claim 1, wherein after the DC voltage across the sub-coil is determined, the PD IC further to enable the power factor correction.

6. The power adapter device of claim 1, wherein prior to the determination of the DC voltage, the PD IC to disable a DC voltage output of the power adapter device.

7. The power adapter device of claim 6, wherein after the DC voltage across the sub-coil is determined, the PD IC further to enable the DC voltage output.

8. A method comprising:

receiving an alternating current (AC) input voltage for a power adapter device at a rectifier bridge of the power adapter device;

disabling a DC voltage output of the power adapter device;

determining, by a power delivery integrated circuit (PD IC) of the power adapter device, a direct current (DC) voltage across a sub-coil in a secondary side of a transformer;

based on the DC voltage, determining a voltage level of the AC input voltage; and storing, by the PD IC, the determined voltage level of the AC input voltage.

9. The method of claim 8, further comprising determining an optimization level of the power adapter device based on the determined voltage level of the AC input voltage.

10. The method of claim 8, further comprising determining a kilowatt per hour consumption of the power adapter device based on the determined voltage level of the AC input voltage.

11. The method of claim 8, further comprising:

receiving a request for data stored in the PD IC; and in response to the reception of the request, providing the voltage level of the AC input voltage.

12. The method of claim 8 wherein prior to the determination of the DC voltage, the method further comprises: disabling a power factor correction of the power adapter device.

13. The method of claim 12, wherein after the DC voltage across the sub-coil is determined, the method further comprises enabling the power factor correction.

14. The method of claim 8 wherein after the DC voltage across the sub-coil is determined, the method further comprises enabling the DC voltage output.

15. A power adapter device comprising:

a rectifier bridge including input terminals to receive an alternating current (AC) input voltage for the power adapter device;

a transformer including a primary side coupled to one of a plurality of output terminals of the rectifier bridge, and a secondary side including a secondary side coil and a sub-coil;

a power delivery integrated circuit (PD IC) coupled to the sub-coil of the transformer, the PD IC to:

detect the AC input voltage;

in response to the detection of the AC input voltage, disable a power factor correction of the power adapter device and direct current (DC) voltage output of the power adapter device;

determine a DC voltage across the sub-coil of the transformer;

based on the DC voltage, determine a voltage level of the AC input voltage; and store the determined voltage level of the AC input voltage.

16. The power adapter device of claim 15, wherein the PD IC further to:

receive a request for data stored in the PD IC; and in response to the reception of the request, provide the voltage level of the AC input voltage.

17. The power adapter device of claim 15, wherein the PD IC further to determine an optimization level of the power adapter device based on the determined voltage level of the AC input voltage.

18. The power adapter device of claim 15, wherein the PD IC further to determine a kilowatt per hour consumption of the power adapter device based on the determined voltage level of the AC input voltage.

19. The power adapter device of claim 15, wherein after the DC voltage across the sub-coil is determined, the PD IC further to enable the power factor correction.

20. The power adapter device of claim 19, wherein after the DC voltage across the sub-coil is determined, the PD IC further to enable the DC voltage output.

* * * * *